US009715730B2

(12) United States Patent
Suzuki

(10) Patent No.: US 9,715,730 B2
(45) Date of Patent: Jul. 25, 2017

(54) THREE-DIMENSIONAL MEASUREMENT APPARATUS AND ROBOT SYSTEM

(71) Applicant: CANON KABUSHIKI KAISHA, Tokyo (JP)

(72) Inventor: Hideaki Suzuki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 700 days.

(21) Appl. No.: 13/927,269

(22) Filed: Jun. 26, 2013

(65) Prior Publication Data
US 2014/0009582 A1 Jan. 9, 2014

(30) Foreign Application Priority Data

Jul. 3, 2012 (JP) .................................. 2012-149596

(51) Int. Cl.
| | | |
|---|---|---|
| *G06T 7/564* | (2017.01) | |
| *G06T 7/00* | (2017.01) | |
| *G01B 11/00* | (2006.01) | |
| *G06T 7/593* | (2017.01) | |
| *H04N 13/02* | (2006.01) | |
| *H04N 13/00* | (2006.01) | |

(52) U.S. Cl.
CPC .......... *G06T 7/0022* (2013.01); *G01B 11/002* (2013.01); *G06T 7/564* (2017.01);
(Continued)

(58) Field of Classification Search
CPC ............................... G06T 7/0022; G06T 7/564
See application file for complete search history.

(56) References Cited

U.S. PATENT DOCUMENTS 6,614,928 B1   9/2003   Chung et al.
7,684,613 B2 *  3/2010   Harada ................. G06T 7/0028
                                                  348/135
(Continued)

FOREIGN PATENT DOCUMENTS

| JP | 2003-248814 A | 9/2003 |
| JP | 2006-003157 A | 1/2006 |
| JP | 2010-117223 A | 5/2010 |

OTHER PUBLICATIONS

European Search Report in European Application No. 13174626.5 issued Dec. 10, 2013.
(Continued)

*Primary Examiner* — Tung Vo
*Assistant Examiner* — Rowina Cattungal
(74) *Attorney, Agent, or Firm* — Fitzpatrick, Cella, Harper & Scinto

(57) ABSTRACT

The three-dimensional measurement apparatus includes: a base camera for capturing a workpiece to acquire a first image; a reference camera for capturing the workpiece from a view point different from the base camera to acquire a second image; and a camera control unit for extracting multiple edge lines from the first and second images, calculating line-of-sight errors with respect to provisional three-dimensional coordinates, wherein the line-of-sight errors are calculated at an endpoint of a first edge line selected from the multiple edge lines of the first image and an endpoint of a second edge line extracted from the multiple edge lines of the second image to correspond to the first edge line, setting an evaluation function from the line-of-sight errors, and a three-dimensional constraint condition set based on a shape of the workpiece, and making an optimization calculation of the evaluation function to measure the three-dimensional coordinates of the workpiece.

9 Claims, 12 Drawing Sheets

(52) U.S. Cl.
CPC .... *G06T 7/593* (2017.01); *G05B 2219/37567* (2013.01); *G06T 2207/10012* (2013.01); *G06T 2207/30164* (2013.01); *H04N 13/0239* (2013.01); *H04N 2013/0081* (2013.01); *Y10S 901/46* (2013.01)

(56) References Cited

U.S. PATENT DOCUMENTS

| | | | |
|---|---|---|---|
| 2008/0089557 A1 | 4/2008 | Iwaki et al. | |
| 2010/0156896 A1* | 6/2010 | Ichimura | G01B 11/245 345/419 |
| 2011/0218776 A1* | 9/2011 | Shono | G06F 17/50 703/1 |
| 2012/0224033 A1* | 9/2012 | Hayashi | G06T 7/0075 348/47 |

OTHER PUBLICATIONS

Belhaoua et al., "Estimation of 3D reconstruction errors in a stereo-vision system", Modeling Aspects in Optical Metrology II., 2009, Proceedings of the SPIE, vol. 7390.

Kenichi Kanatani, "Statistics for Image Understanding: Reliability Evaluation of Geometric Interpretation from Images", IPSJ Magazine, Jan. 15, 1996, pp. 52-60, vol. 37, No. 1, Information Processing Society of Japan (IPSJ), Japan.

* cited by examiner

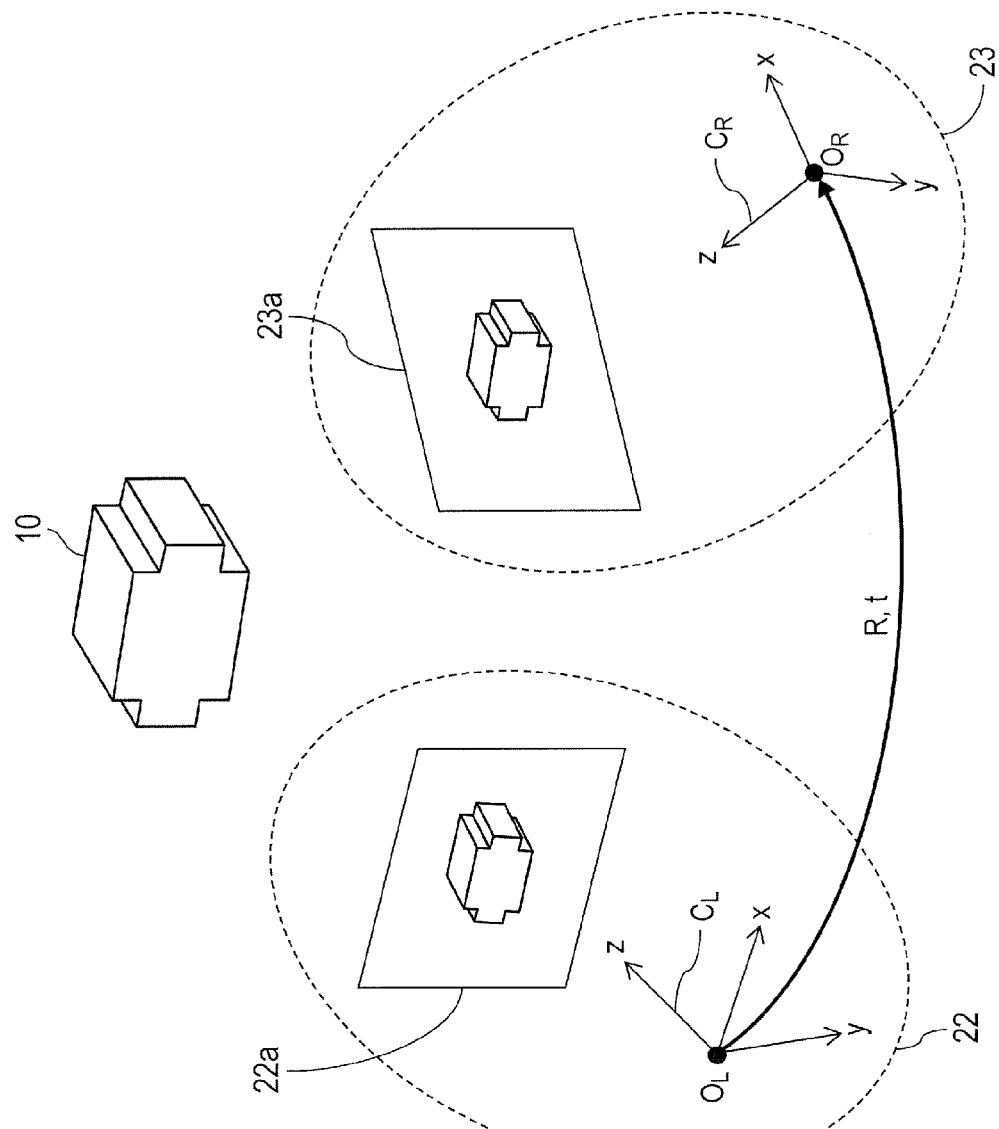

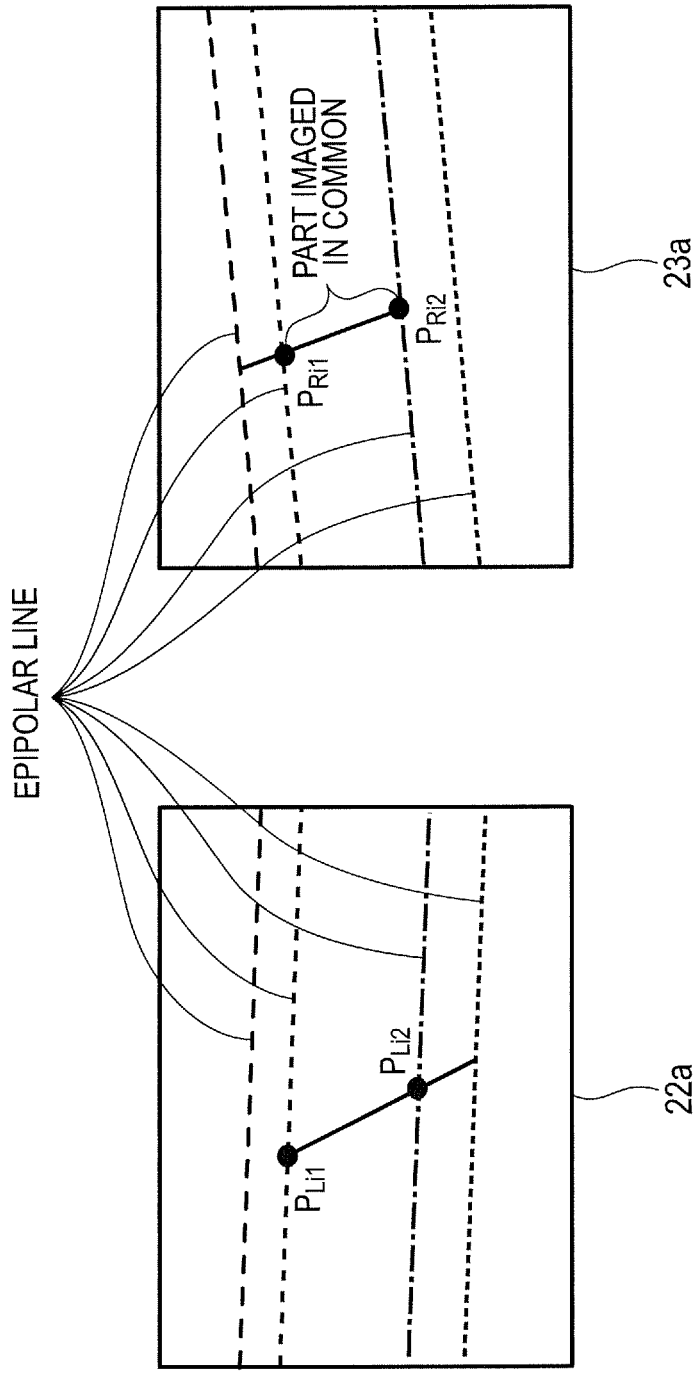

FIG. 8

| CORRESPONDING NUMBER | BASE IMAGE EDGE LINE | REFERENCE IMAGE EDGE LINE | THREE-DIMENSIONAL EDGE LINE | CORRESPONDING POINT ON BASE IMAGE | CORRESPONDING POINT ON REFERENCE IMAGE | COORDINATES OF END POINT OF THREE-DIMENSIONAL EDGE LINE | LINE-OF-SIGHT ERROR TERM |
|---|---|---|---|---|---|---|---|
| 1 | $L_2$ | $R_1$ | $E_1$ | $P_{L11}$ | $P_{R11}$ | $X_{11} = {}^T(x_{11}, y_{11}, z_{11})$ | $d_{L11}^2 + d_{R11}^2$ |
|   |       |       |       | $P_{L12}$ | $P_{R12}$ | $X_{12} = {}^T(x_{12}, y_{12}, z_{12})$ | $d_{L12}^2 + d_{R12}^2$ |
| 2 | $L_3$ | $R_2$ | $E_2$ | $P_{L21}$ | $P_{R21}$ | $X_{21} = {}^T(x_{21}, y_{21}, z_{21})$ | $d_{L21}^2 + d_{R21}^2$ |
|   |       |       |       | $P_{L22}$ | $P_{R22}$ | $X_{22} = {}^T(x_{22}, y_{22}, z_{22})$ | $d_{L22}^2 + d_{R22}^2$ |
| ⋮ |       |       |       |           |           |                                            |                           |
| i | $L_{\alpha(i)}$ | $R_{\beta(i)}$ | $E_i$ | $P_{Li1}$ | $P_{Ri1}$ | $X_{i1} = {}^T(x_{i1}, y_{i1}, z_{i1})$ | $d_{Li1}^2 + d_{Ri1}^2$ |
|   |                 |                |       | $P_{Li2}$ | $P_{Ri2}$ | $X_{i2} = {}^T(x_{i2}, y_{i2}, z_{i2})$ | $d_{Li2}^2 + d_{Ri2}^2$ |
| ⋮ |       |       |       |           |           |                                            |                           |
| N | $L_{\alpha(N)}$ | $R_{\beta(N)}$ | $E_N$ | $P_{LN1}$ | $P_{RN1}$ | $X_{N1} = {}^T(x_{N1}, y_{N1}, z_{N1})$ | $d_{LN1}^2 + d_{RN1}^2$ |
|   |                 |                |       | $P_{LN2}$ | $P_{RN2}$ | $X_{N2} = {}^T(x_{N2}, y_{N2}, z_{N2})$ | $d_{LN2}^2 + d_{RN2}^2$ |

THREE-DIMENSIONAL MEASUREMENT APPARATUS AND ROBOT SYSTEM

BACKGROUND OF THE INVENTION

Field of the Invention

The present invention relates to a three-dimensional measurement apparatus for capturing images of a workpiece from two or more view points to make a three-dimensional measurement or view the workpiece stereoscopically, and a robot system including the same.

Description of the Related Art

Conventionally, as a method of measuring the three-dimensional shape of a workpiece in a non-contact manner, a stereo method has been known, in which the workpiece is captured from cameras located at two or more view points to measure a three-dimensional shape of the workpiece from the captured two or more images. In the stereo method, edge lines of the workpiece on the captured images may be used to measure the three-dimensional shape of the workpiece with a small amount of information.

The stereo method for measuring the three-dimensional shape using edge lines can obtain an exact three-dimensional shape of the workpiece under ideal conditions, but there is an error in calibrating a camera or an error in extracting an edge line in practice. This causes a problem that edge lines that should have been connected are recreated in twisted positions or the angle between edge lines is inaccurate in the measured three-dimensional shape.

In contrast to this, there is proposed a technique for using a condition that a plurality of edge lines of a workpiece lies on the same plane (hereinafter called "plane constraint condition") to correct a corresponding point in order to improve the accuracy of three-dimensional measurement (see Japanese Patent Application Laid-Open No. 2003-248814).

However, in the technique disclosed in Japanese Patent Application Laid-Open No. 2003-248814, the plane constraint condition that a group of points on the same plane should meet to determine a plane parameter in order to correct a corresponding point on an image. Therefore, multiple three-dimensional constraint conditions, such as a relative angle between edge lines that do not lie on the same plane and a stereoscopic positional relationship between edge lines, cannot be added.

When three-dimensional data is actually generated from captured images, it is often the case that multiple three-dimensional constraint conditions, such as "edge lines are perpendicular to each other", "edge lines are parallel to each other", and "edge lines lie on the same straight line", are already known by design. Therefore, a three-dimensional measurement apparatus is desired, which applies these multiple three-dimensional constraint conditions to improve the accuracy of three-dimensional measurement.

The present invention provides a three-dimensional measurement apparatus capable of measuring a highly accurate three-dimensional shape and a robot system including the same.

SUMMARY OF THE INVENTION

The present invention includes: a first camera for capturing a workpiece to acquire a first image; a second camera for capturing the workpiece from a view point different from that of the first camera to acquire a second image; and a control unit for extracting a plurality of edge lines of the workpiece respectively from the first image and the second image, calculating each of line-of-sight errors with respect to provisional three-dimensional coordinates, wherein the line-of-sight errors are calculated from an endpoint of a first edge line selected from the plurality of edge lines of the first image and an endpoint of a second edge line extracted from the plurality of edge lines of the second image so as to correspond to the first edge line, setting an evaluation function from the respective line-of-sight errors and a three-dimensional constraint condition set based on the three-dimensional shape of the workpiece, and making an optimization calculation based on the evaluation function to determine three-dimensional coordinates of the workpiece.

The present invention further provides a three-dimensional measurement apparatus including: a first camera for capturing a workpiece to acquire a first image; a second camera for capturing the workpiece from a view point different from that of the first camera to acquire a second image; and a control unit for extracting a plurality of edge lines of the workpiece respectively from the first image and the second image, calculating a line-of-sight error at an endpoint of a first edge line with respect to provisional three-dimensional coordinates, wherein the first edge line is selected from the plurality of edge lines of the first image, calculating a viewing plane error in a second edge line with respect to the provisional three-dimensional coordinates, wherein the second edge line is extracted from the plurality of edge lines of the second image so as to correspond to the first edge line, setting an evaluation function from the line-of-sight error at the endpoint of the first edge line, the viewing plane error in the second edge line, and a three-dimensional constraint condition set based on the three-dimensional shape of the workpiece, and making an optimization calculation based on the evaluation function to determine three-dimensional coordinates of the workpiece.

The present invention further provides a three-dimensional measurement method including: extracting a plurality of edge lines of a workpiece from a first image acquired by capturing the workpiece with a first camera; extracting a plurality of edge lines of the workpiece from a second image acquired by capturing the workpiece with a second camera; calculating an endpoint of a second edge line corresponding to an endpoint of a first edge line, wherein the second edge line is extracted from the plurality of edge lines of the second image so as to correspond to the first edge line selected from the plurality of edge lines of the first image; calculating each of line-of-sight errors at the endpoint of the first edge line and the endpoint of the second edge line with respect to provisional three-dimensional coordinates; setting an evaluation function from the line-of-sight errors respectively set at the endpoint of the first edge line and the endpoint of the second edge line, and a three-dimensional constraint condition set based on the three-dimensional shape of the workpiece; and making an optimization calculation to minimize or maximize the value of the evaluation function to determine three-dimensional coordinates of the workpiece.

Further, the present invention provides a three-dimensional measurement method including: extracting a plurality of edge lines of a workpiece from a first image acquired by capturing the workpiece with a first camera; extracting a plurality of edge lines of the workpiece from a second image acquired by capturing the workpiece with a second camera; calculating a line-of-sight error at an endpoint of a first edge line with respect to provisional three-dimensional coordinates, wherein the first edge line is arbitrarily selected from the plurality of edge lines of the first image, and a viewing plane error in a second edge line with respect to the provisional three-dimensional coordinates, wherein the second edge line is extracted from the plurality of edge lines of the second image so as to correspond to the first edge line; setting an evaluation function from the line-of-sight error at the endpoint of the first edge line, the viewing plane error in the second edge line, and a three-dimensional constraint condition set based on the three-dimensional shape of the workpiece; and making an optimization calculation to minimize or maximize the value of the evaluation function to determine three-dimensional coordinates of the workpiece.

Further features of the present invention will become apparent from the following description of exemplary embodiments with reference to the attached drawings.

BRIEF DESCRIPTION OF THE DRAWINGS

FIG. 5 is a schematic diagram illustrating a base camera, a reference camera, and a workpiece according to the first embodiment.

FIG. 6 is a diagram for describing how to determine corresponding points using epipolar lines.

FIG. 8 is a table illustrating a data structure when mapping is done between edge lines according to the first embodiment.

DESCRIPTION OF THE EMBODIMENTS

Exemplary embodiments of the present invention will now be described in detail with reference to the accompanying drawings.

First Embodiment

Figure 1:
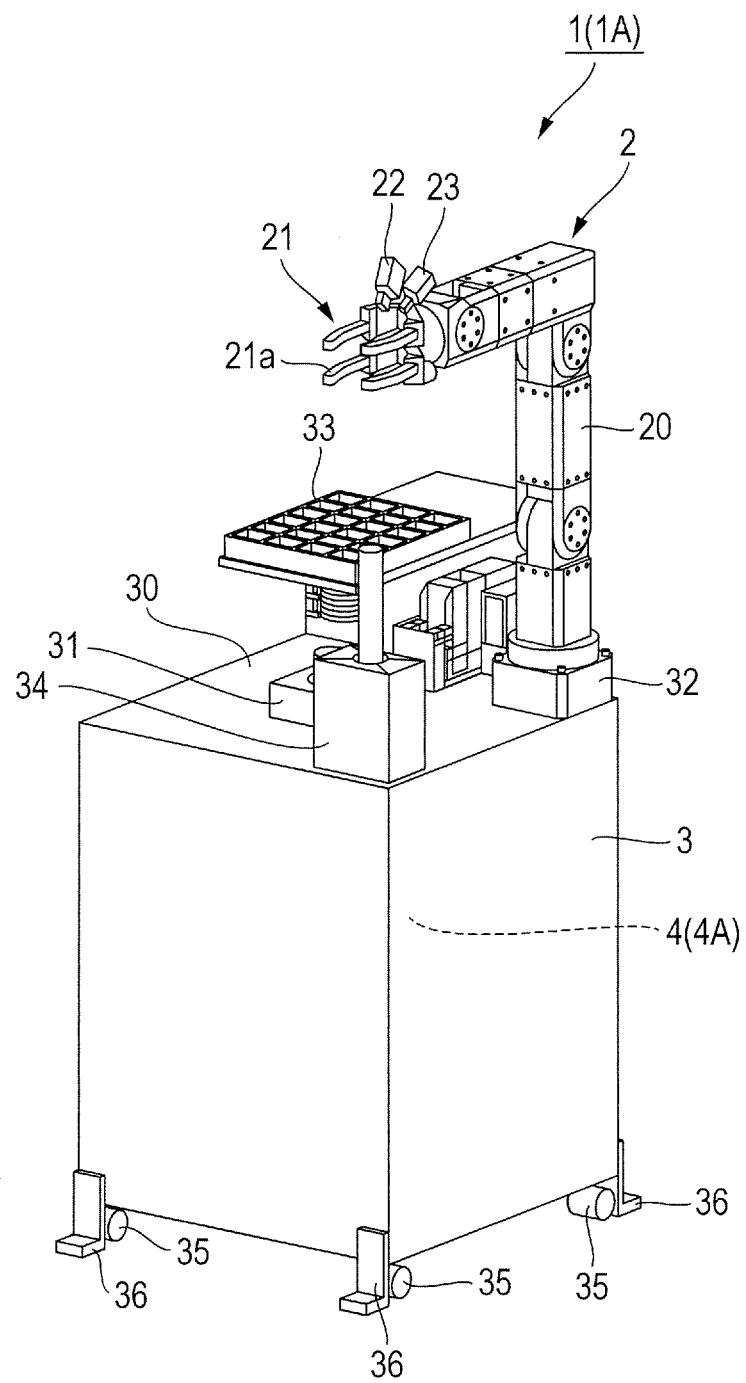
FIG. 1 is a perspective view illustrating a schematic structure of a robot system according to an exemplary embodiment of the present invention.
Figure 2:
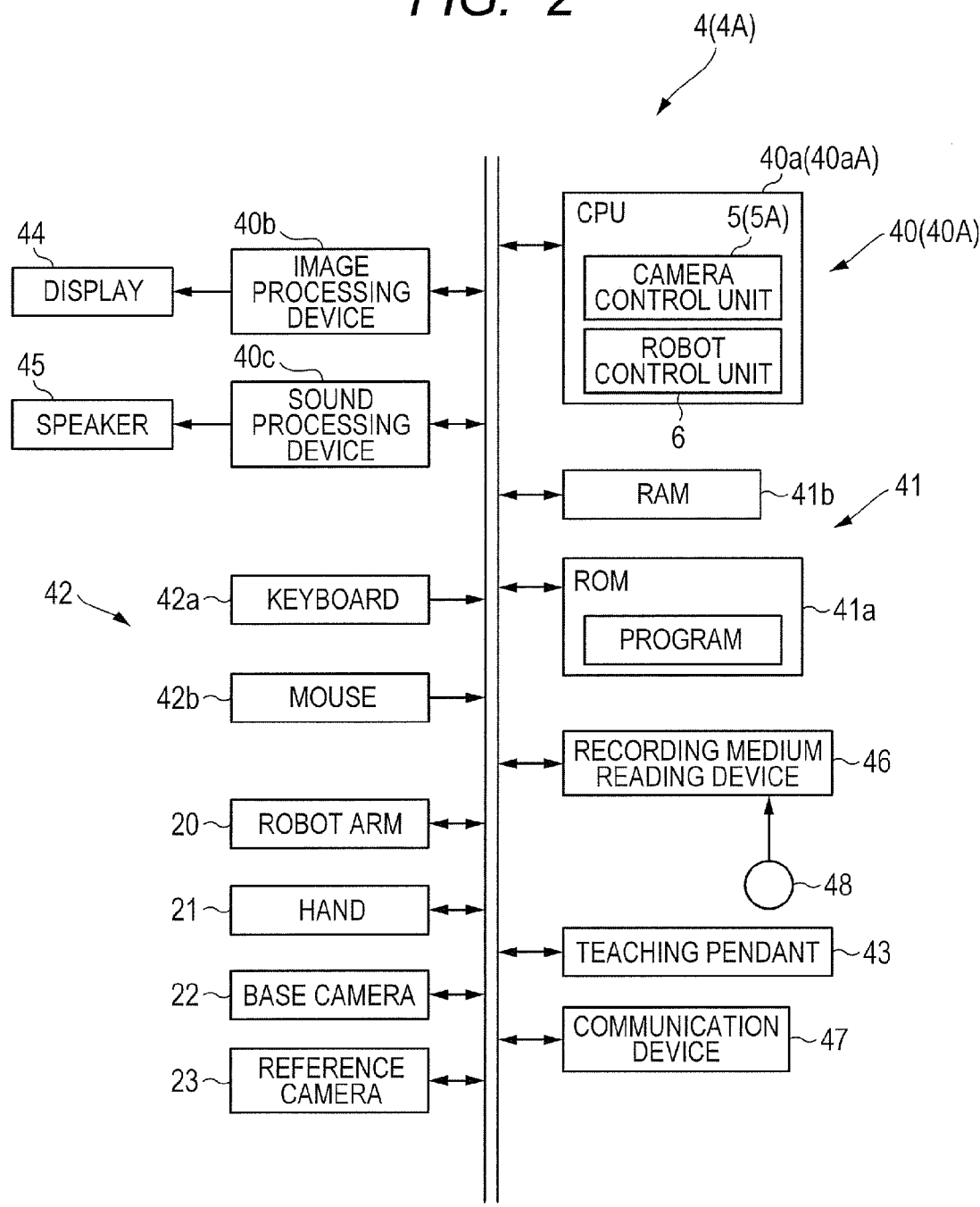
FIG. 2 is a block diagram illustrating the configuration of a control device in the robot system according to the exemplary embodiment.
Figure 3:
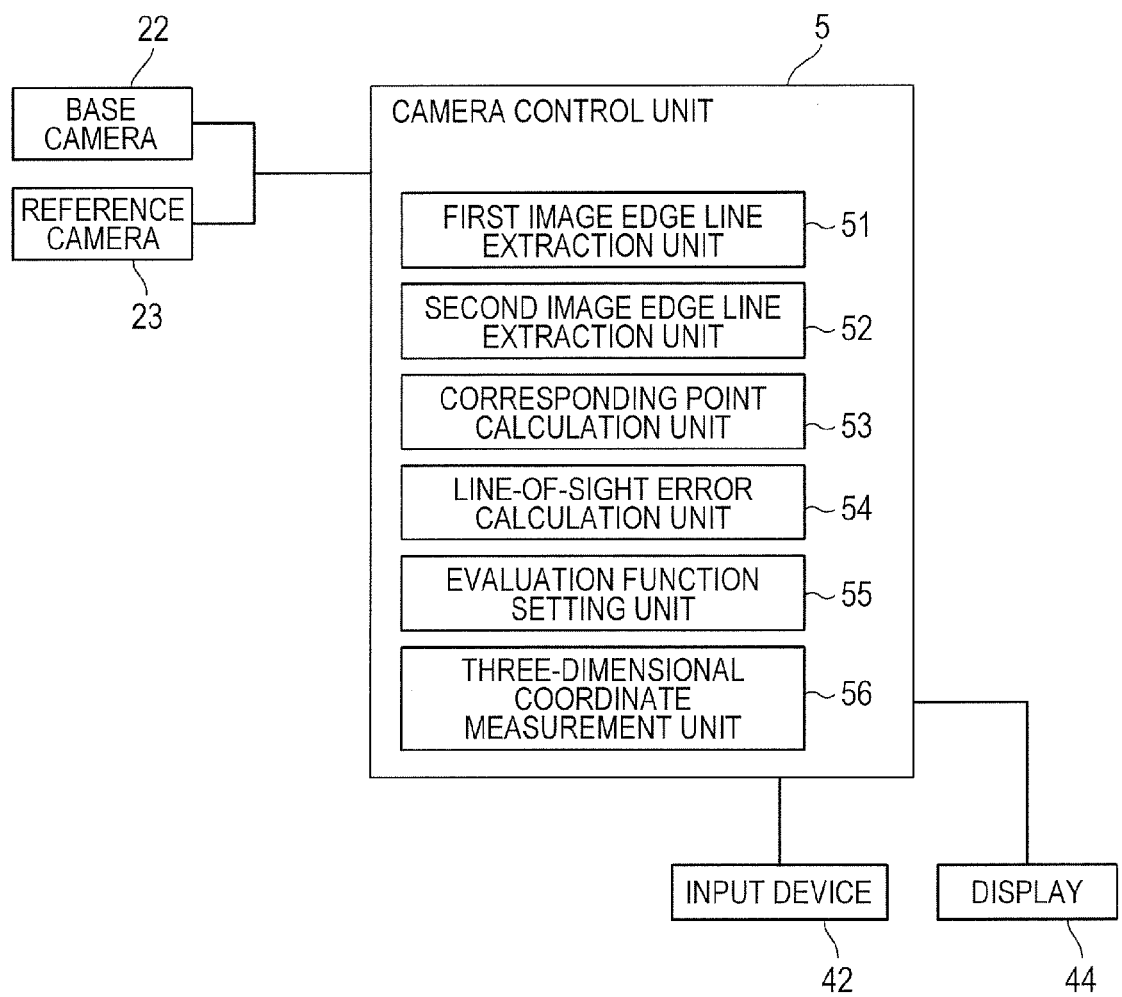
FIG. 3 is a block diagram illustrating the configuration of a camera control unit according to a first embodiment.

A robot system 1 according to a first embodiment of the present invention will be described below with reference to FIG. 1 to FIG. 9. First, a schematic structure of the robot system 1 will be described with reference to FIG. 1 to FIG. 3. FIG. 1 is a perspective view illustrating the robot system 1 according to an exemplary embodiment of the present invention. FIG. 2 is a block diagram illustrating the configuration of a control device 4 in the robot system 1 according to the exemplary embodiment. FIG. 3 is a block diagram illustrating the configuration of a camera control unit 5 according to the first embodiment.

As illustrated in FIG. 1, the robot system 1 according to the first embodiment includes a robot 2 for assembling a workpiece, a mounting base 3 on which the robot 2 assembles the workpiece, and the control device 4 for controlling the robot 2.

The robot 2 is a six-axis articulated general-purpose robot including a robot arm 20, a hand 21 attached to the tip of the robot arm, a base camera 22 as a first camera, and a reference camera 23 as a second camera. In the embodiment, two cameras, i.e. the base camera 22 and the reference camera 23 are used, but a compound-eye camera such as a stereo camera may be used.

The robot arm 20 is equipped with six actuators (not illustrated) for driving each joint to rotate about each joint axis. The six actuators are selectively driven, respectively, to move the hand 21 attached to the tip to any three-dimensional position. The hand 21 is equipped with a gripping portion 21a for gripping the workpiece and an actuator, not illustrated, for driving the gripping portion 21a. The hand 21 is moved by the driving of the robot arm 20 to a position in which the actuator is so driven that the hand 21 will grip the workpiece. A force sensor, not illustrated, is provided in the hand 21 to regulate a grip force when the workpiece is gripped. The hand 21 is detachably attached to the tip of the robot arm 20 in a manner to be changeable according to the shape of the workpiece to work on.

The base camera 22 is attached to the tip of the robot arm 20 to capture an image of the workpiece in order to acquire a first image of the workpiece. The reference camera 23 is attached adjacent to the base camera 22 at the tip of the robot arm 20 to capture an image of the workpiece from a view point different from the base camera 22 in order to acquire a second image of the workpiece.

The mounting base 3 is formed into a rectangular box shape, and provided with a planar placement section 30 with the workpiece placed on the top face thereof. A jig used to assemble the workpiece is provided substantially in a central portion of the placement section 30. A support 32 for immovably supporting the base end section of the robot arm 20, a parts feeder 33, and a tool holder 34 are provided at the corners of the placement section 30, respectively. Four casters 35 for moving the mounting base 3 and four fixing brackets 36 for fixing the mounting base 3 to the floor are provided at the bottom of the mounting base 3 so that the mounting base 3 can be fixed after the mounting base 3 is moved to any position.

As illustrated in FIG. 2, the control device 4 is so configured that the robot arm 20, the hand 21, the base camera 22, and the reference camera 23 are connected through a bus to a computer main body having a calculating device 40 and a storing device 41. An input device 42, a teaching pendant 43, a display 44, a speaker 45, a recording medium reading device 46, a communication device 47, and the like are also connected to the computer main body through the bus. In FIG. 2, interfaces for these connections are not illustrated.

The calculating device 40 includes a CPU 40a, an image processing device 40b, and a sound processing device 40c. The CPU 40a includes a camera control unit 5 and a robot control unit 6. The camera control unit 5 measures the three-dimensional position of a workpiece according to various programs stored in the storing device 41 and the settings input from the input device 42.

As illustrated in FIG. 3, the camera control unit 5 includes a first image edge line extraction unit 51, a second image edge line extraction unit 52, a corresponding point calculation unit 53, a line-of-sight error calculation unit 54, an evaluation function setting unit 55, and a three-dimensional coordinate measurement unit 56.

The first image edge line extraction unit 51 extracts a plurality of edge lines of the workpiece from a first image acquired by capturing the workpiece with the base camera 22. The second image edge line extraction unit 52 extracts a plurality of edge lines of the workpiece from a second image acquired by capturing the workpiece with the reference camera 23. The corresponding point calculation unit 53 extracts, from the plurality of edge lines of the second image, a second edge line corresponding to a first edge line arbitrarily selected from the plurality of edge lines of the first image, and calculates an endpoint of the extracted second edge line corresponding to an endpoint of the first edge line. The line-of-sight error calculation unit 54 sets provisional three-dimensional coordinates and calculates respective line-of-sight errors at the endpoint of the first edge line and the endpoint of the second edge line with respect to the provisional three-dimensional coordinates. The evaluation function setting unit 55 sets an evaluation function including the line-of-sight errors and three-dimensional constraint conditions from the line-of-sight errors respectively set at the endpoint of the first edge line and the endpoint of the second edge line, and the three-dimensional constraint conditions set based on the shape of the workpiece. The three-dimensional coordinate measurement unit 56 makes an optimization calculation to minimize or maximize the evaluation function in order to measure the three-dimensional coordinates of the workpiece. The measurement of the three-dimensional position of the workpiece by the camera control unit 5 will be described in detail later.

Based on the three-dimensional position of the workpiece measured by the camera control unit 5, the various programs stored in the storing device 41, and the settings input from the input device 42, the robot control unit 6 controls the robot arm 20 and the hand 21. The description of the control of the robot arm 20 and the hand 21 performed by the robot control unit 6 will be omitted.

The image processing device 40b controls the display 44 in accordance with a drawing instruction from the CPU 40a to display a predetermined image on the screen. The sound processing device 40c generates a sound signal in accordance with a sound generation instruction from the CPU 40a to output the sound signal to the speaker 45.

The storing device 41 is connected to the CPU 40a through the bus, and includes a ROM 41a in which the various programs and data are stored, and a RAM 41b reserved as a working area of the CPU 40a. In the embodiment, the various programs for measuring the workpiece three-dimensionally are stored in the ROM 41a in addition to drive programs for the robot arm 20 and the hand 21. For example, a three-dimensional measurement program for executing a first image edge line extraction process, a second image edge line extraction process, a corresponding point calculation process, a line-of-sight error calculation process, an evaluation function setting process, and a three-dimensional coordinate measurement process to be described later is stored. When an operator enters three-dimensional constraint conditions and data, such as camera parameters of the base camera 22 and the reference camera 23, via the input device 42, these are also stored in the ROM 41a.

The input device 42 includes a keyboard 42a and a mouse 42b to enable input of information necessary to measure the three-dimensional position of the workpiece and other instructions. The recording medium reading device 46 is used to read a computer-readable recording medium 48 that has recorded, for example, the three-dimensional measurement program, and to store the three-dimensional measurement program in the ROM 41a. The communication device 47 is used to download the three-dimensional measurement program distributed from the Internet through the communication device 47 without using the recording medium 48 mentioned above.

Figure 4A:
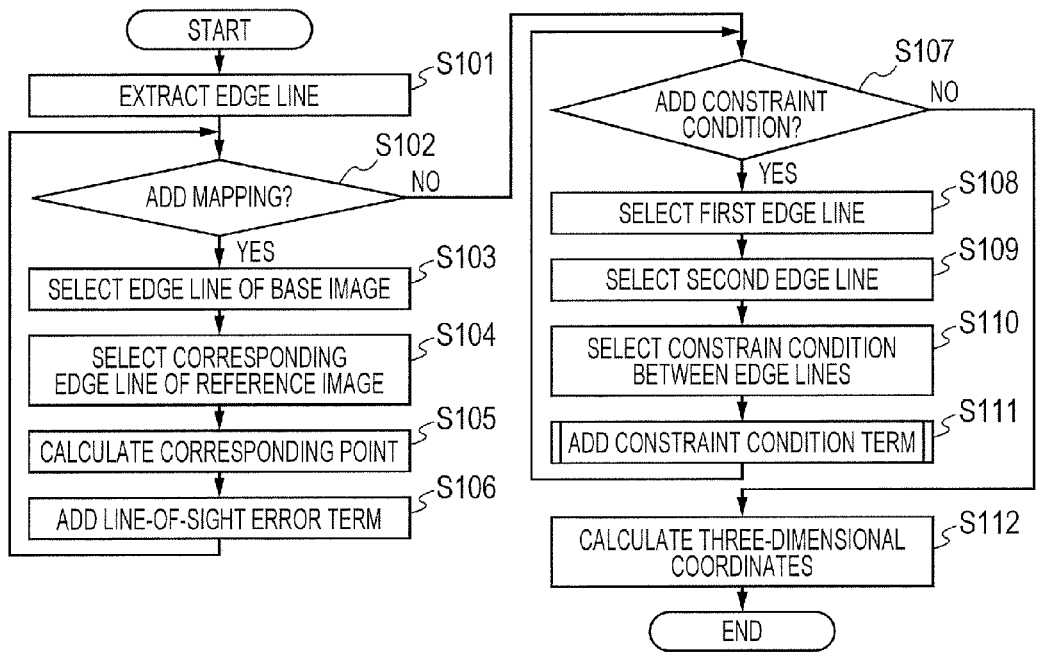
FIG. 4A and FIG. 4B are flowcharts illustrating a measurement of three-dimensional coordinates according to the first embodiment.
Figure 4B:
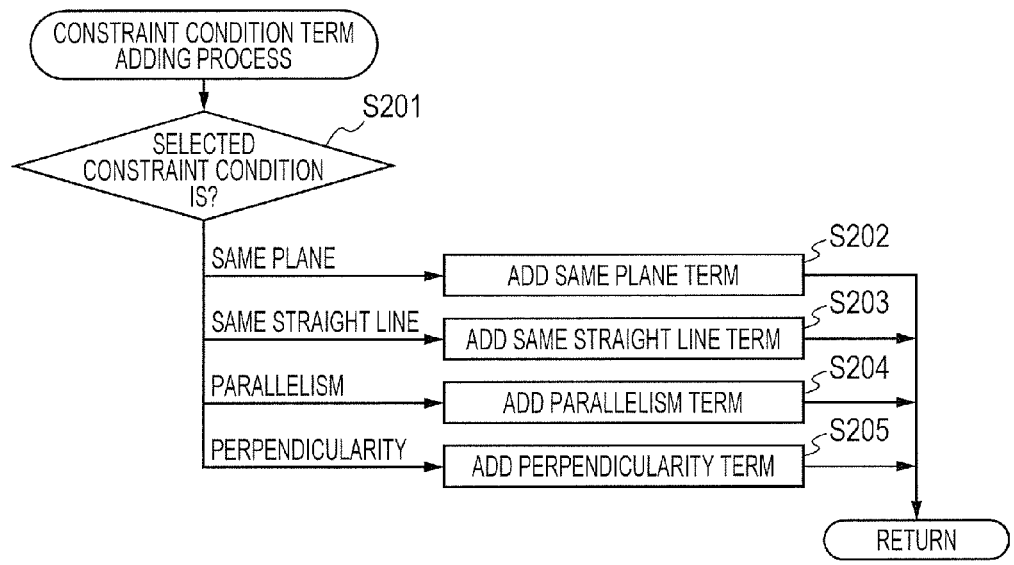
Figure 7:
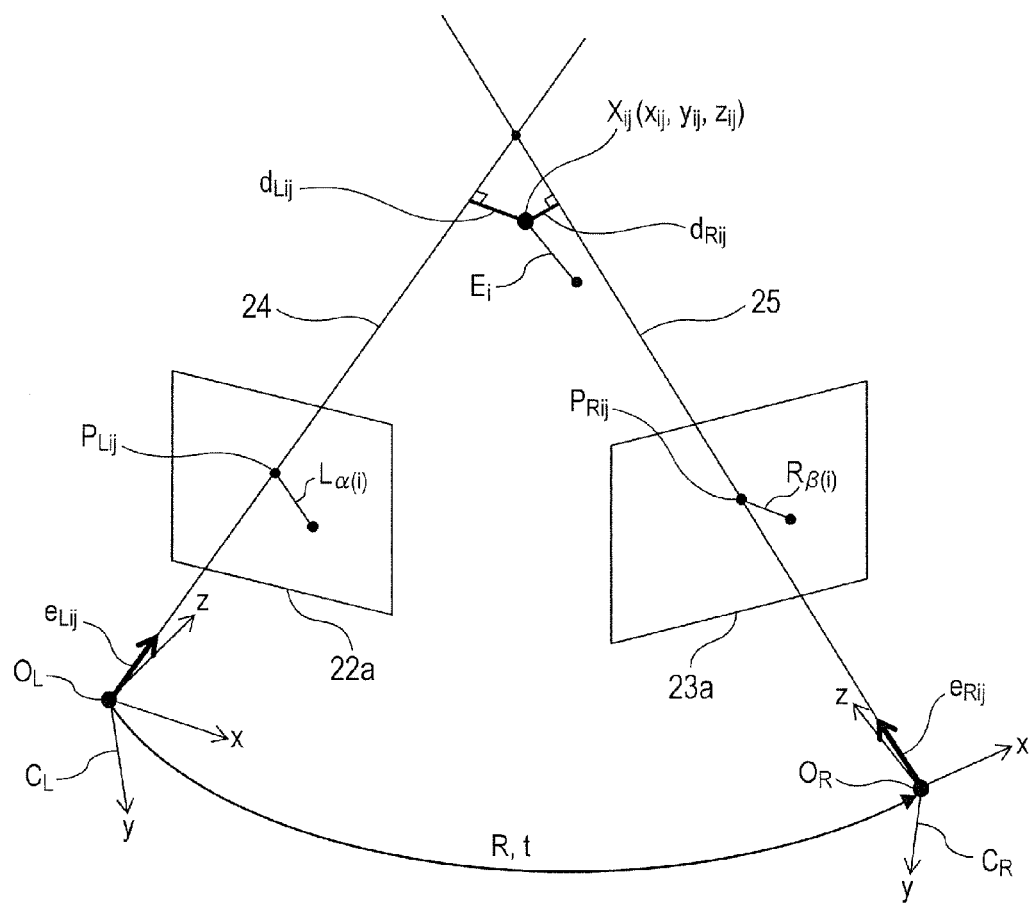
FIG. 7 is a schematic diagram for describing line-of-sight errors at a first endpoint of a first edge line and a second endpoint of a second edge line.
Figure 9:
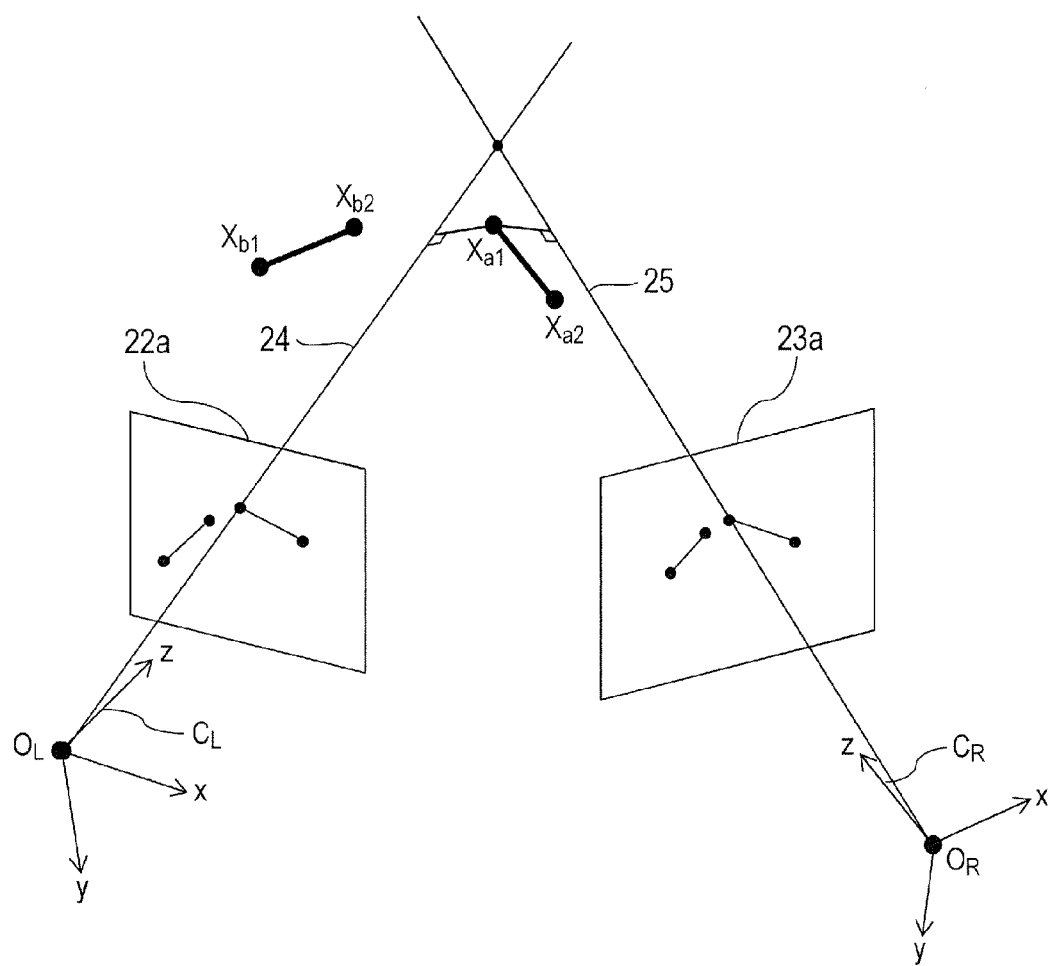
FIG. 9 is a schematic diagram for describing a three-dimensional constraint condition between edge lines according to the first embodiment.

Next, a method of measuring the three-dimensional coordinates of the workpiece by the camera control unit 5 in the robot system 1 structured as mentioned above will be described along flowcharts illustrated in FIG. 4A and FIG. 4B while referring to FIG. 5 to FIG. 9. FIG. 4A and FIG. 4B are flowcharts illustrating a measurement of three-dimensional coordinates according to the first embodiment. FIG. 5 is a schematic diagram illustrating the base camera 22, reference camera 23, and the workpiece according to the first embodiment. FIG. 6 is a diagram for describing how to determine corresponding points using epipolar lines. FIG. 7 is a schematic diagram for describing line-of-sight errors at a first endpoint of the first edge line and a second endpoint of the second edge line. FIG. 8 is a table illustrating a data structure when mapping is done between edge lines according to the first embodiment. FIG. 9 is a schematic diagram for describing a three-dimensional constraint condition between edge lines according to the first embodiment.

First, as illustrated in FIG. 5, the Z-axis of each camera coordinate system is set to be perpendicular to each image plane with their origins at respective lens principal points $O_L$ and $O_R$ of the base camera 22 and the reference camera 23 placed to have a common field of view from different view points. Hereafter, a coordinate system representative of the base camera 22 is denoted as a base camera coordinate system $C_L$, a coordinate system representative of the reference camera 23 is denoted as a reference camera coordinate system $C_R$, the image plane of the base camera 22 is denoted as a base image plane 22a, and the image plane of the reference camera 23 is denoted as a reference image plane 23a.

Next, internal parameters of the base camera 22, internal parameters of the reference camera 23, and external parameters of the cameras are determined and stored in the ROM 41a. The internal parameters are parameters required to calculate a projection from any three-dimensional coordinates expressed in each camera coordinate system to a point on each image plane, which can be determined by a known camera calibration technique. In the embodiment, the detailed description of how to calculate the internal parameters will be omitted, and the following expression is used as the internal parameters.

Suppose that f denotes the focal length of a lens, $c_u$ denotes the column coordinate of an intersection point of the optical axis of a camera with an image plane, $c_v$ denotes the row coordinate of the intersection point of the optical axis of the camera with the image plane, $s_x$ denotes the width of an image sensor per pixel, and $s_y$ denotes the height of the image sensor per pixel. The column coordinate $c_u$ and the row coordinate $c_v$ means that an image pixel in the $c_u$-th column from the left and the $c_v$-th row from the top is the intersection point of the optical axis of the camera with the image plane. The values of $c_u$ and $c_v$ do not need to be integers, which may be determined with subpixel accuracy. Further, the focal distance f, the width $s_x$ per pixel, and the height $s_y$ per pixel are represented in typical units of length (e.g., millimeters or meters).

The internal parameters of the base camera 22 can be expressed as $(f_L, c_{uL}, c_{vL}, s_{xL}, s_{yL})$, and the internal parameters of the reference camera 23 can be expressed as ($f_R$, $c_{uR}$, $c_{vR}$, $s_{xR}$, $s_{yR}$). Note that the subscript L indicates the internal parameters of the base camera 22, and the subscript R indicates the internal parameters of the reference camera 23.

Using the internal parameters, a point of the image coordinates (u, v) can be transformed to coordinates $P={}^T(x, y, z)$ in the camera coordinate system as follows.

$$P = \begin{pmatrix} x \\ y \\ z \end{pmatrix} = \begin{pmatrix} s_x(u - c_u) \\ s_y(v - c_v) \\ f \end{pmatrix}$$

The external parameters are parameters representing relative postures of the base camera 22 and the reference camera 23 in six degrees of freedom, which can be determined by the known camera calibration technique. In the embodiment, the detailed description of how to calculate the external parameters between the base camera 22 and the reference camera 23 will be omitted, and the external parameters are represented by a rotation matrix R and a translation vector t.

Here, the rotation matrix R and the translation vector t represent a coordinate transformation from the base camera coordinate system $C_L$ to the reference camera coordinate system $C_R$, and any three-dimensional coordinates ${}^{(R)}X$ described in the reference camera coordinate system $C_R$ are expressed using the external parameters in the base camera coordinate system $C_L$ as follows.

$$X = {}^{(L)}X = R \cdot {}^{(R)}X + t$$

In the above, the subscripts ${}^{(L)}$ and ${}^{(R)}$ are used to make them clear to be the respective coordinate values expressed in the base camera coordinate system $C_L$ and the reference camera coordinate system $C_R$. In the following description, it is assumed that the base camera coordinate system is the entire base coordinate system, and the coordinates without any subscript indicative of a coordinate system are described in the base camera coordinate system. In this case, $O_L = {}^T(0, 0, 0)$ and $O_R = t$. There are various forms of expression of the internal parameters and external parameters of the cameras, such as a matrix form, but it is not essential to use which form in the embodiment. Further, in the embodiment, no lens distortion is taken into account, but parameters that take the lens distortion into account may be used.

Next, preparations for an evaluation function are made. In the embodiment, the evaluation function for evaluating an error from a line of sight with respect to an image point and an error from a three-dimensional constraint condition assumes an important role. In the embodiment, the evaluation function is denoted by F. The evaluation function F according to the embodiment is expressed as the sum of a line-of-sight error term portion and a three-dimensional constraint condition term portion. The line-of-sight error term portion of the evaluation function F is denoted by $F_{sight(N)}$ and the three-dimensional constraint condition term portion of the evaluation function F is denoted by $F_{const(M)}$, i.e., the evaluation function F is given as follows.

$$F = F_{sight(N)} + F_{const(M)}$$

The initial values upon starting a processing flow illustrated in FIGS. 4A and 4B are $F_{sight(N)} = 0$ and $F_{const(M)} = 0$ and a term is added by looping. The subscript N indicates the line-of-sight error term on the first to N-th edge mappings, and the subscript M indicates the constraint condition term at the time of setting M constraint conditions.

Next, a workpiece 10 is captured with the base camera 22 to acquire a base image 22b as the first image, and edge line extraction processing is performed on the acquired base image 22b to extract a plurality of edge lines of the workpiece 10 (step S101: first image edge line extraction process). Specifically, an edge extraction filter such as Sobel filter or Canny filter is first used for the base image 22b to extract, as an edge point group, points at which the luminance change is maximized. Next, linear approximation processing is performed on the extracted edge point group while dividing them into line segments to determine image coordinates (pixel position) of each endpoint. Although the image coordinates may take pixel-wise values, it is desired to use processing with subpixel accuracy in order to make a high accuracy measurement. In the embodiment, a line segment obtained by approximating an edge point group is called an edge line. Similarly, edge line extraction processing is performed on a reference image 23b as the second image obtained by capturing the workpiece 10 with the reference camera 23 to extract a plurality of edge lines of the workpiece 10 (step S101: second image edge line extraction process).

Next, mapping processing is performed to identify where the plurality of edge lines extracted in the base image 22b are imaged in the reference image 23b, and the results are stored in the ROM 41a. In other words, mapping between the plurality of edge lines extracted from the base image 22b and the plurality of edge lines extracted from the reference image 23b is done and the results are stored. The mapping processing is continuously performed until the end of the mapping processing is determined (steps S102 to S106). The mapping may be done by specifying edge lines believed to be the same by a user while viewing images on a UI, or done by using a known technique in which the camera control unit 5 detects similar image patterns using image correlation to make a selection. Specifically, one edge line (first edge line) is selected from the plurality of edge lines extracted from the base image 22b (step S103) to select an edge line (second edge line) corresponding thereto within the reference image 23b (step S104). Processing to be described below is performed on the associated first edge line and second edge line to determine one edge line in a three-dimensional space.

Because of restrictions such as lighting conditions, it is not always true that endpoints of the edge lines mapped as mentioned above (e.g., first edge line and second edge line) are the same points. Therefore, epipolar constraints are imposed on the mapped edge lines to determine correspondences between points on the edge lines (step S105: corresponding point calculation process).

In step S101, for example, since the image coordinates of the endpoint of the selected first edge line are known, an intersection point of an epipolar line on the reference image 23b corresponding to the endpoint of the first edge line and the second edge line on the reference image 23b can be determined to determine the coordinates of a corresponding point. For example, as illustrated in FIG. 6, the epipolar constraints are used to determine a part imaged in common between the base image 22b and the reference image 23b in order to determine respective endpoints. In FIG. 6, epipolar lines indicated by the same type of broken line between the base image 22b and the reference image 23b correspond to each other. This corresponding point calculation processing is performed to determine the image coordinates of image points $P_{Li1}$, $P_{Li2}$, $P_{Ri1}$, and $P_{Ri2}$ on the respective images with respect to i-th edge line correspondences.

Next, a line-of-sight error term on an unknown three-dimensional coordinates $X_{ij}$ is determined using the image coordinates of corresponding points determined in step S105 (step S106: line-of-sight error calculation process). Here, the subscript i indicates the i-th edge line correspondences and the subscript j, where j=1, 2, corresponds to both endpoints of the respective edge lines. When a base image line of sight 24 and a reference image line of sight 25, which connect the lens principal points $O_L$, $O_R$ and image points $P_{Lij}$, $P_{Rij}$, respectively, are considered, the line-of-sight error term is so defined that the values thereof will be large according to distances $d_{Lij}$, $d_{Rij}$ from the base image line of sight and the reference image line of sight to the three-dimensional coordinates $X_{ij}$. Here, as illustrated in FIG. 7, the "distances $d_{Lij}$, $d_{Rij}$ from the base image line of sight 24 and the reference image line of sight 25 to the three-dimensional coordinates $X_{ij}$" are the lengths of perpendicular lines from the three-dimensional coordinates $X_{ij}$ to the base image line of sight 24 and the reference image line of sight 25, respectively. In the embodiment, the sum of squared distances $d_{Lij}$ and $d_{Rij}$ from the base image line of sight 24 and the reference image line of sight 25 to the three-dimensional coordinates $X_{ij}$ is used as the line-of-sight error term.

The following will describe the calculation of the line-of-sight error term using mathematical expressions. First, if the image coordinates of the image point $P_{Lij}$ are denoted by $(u_{Lij}, v_{Lij})$ and the image coordinates of the image point $P_{Rij}$ are denoted by $(u_{Rij}, v_{Rij})$, the coordinate values of the image points $P_{Lij}$ and $P_{Rij}$ in the respective camera coordinate systems can be expressed in the following equations.

For left image point PLij:

$$P_{Lij} = \begin{pmatrix} x_{Lij} \\ y_{Lij} \\ z_{Lij} \end{pmatrix} = \begin{pmatrix} s_{xL}(u_{Lij} - c_{uL}) \\ s_{yL}(v_{Lij} - c_{vL}) \\ f_L \end{pmatrix}$$

For right image point PRij:

$$^{(R)}P_{Rij} = \begin{pmatrix} x'_{Rij} \\ y'_{Rij} \\ z'_{Rij} \end{pmatrix} = \begin{pmatrix} s_{xR}(u_{Rij} - c_{uR}) \\ s_{yR}(v_{Rij} - c_{vR}) \\ f_R \end{pmatrix}$$

$$P_{Rij} = R \times {}^{(R)}P_{Rij} + t$$

Next, line-of-sight unit vectors from the origins $O_L$ and $O_R$ of the respective camera coordinate systems toward the image points $P_{Lij}$ and $P_{Rij}$ are determined. If the line-of-sight unit vectors are denoted by $e_{Lij}$ and $e_{Rij}$, the line-of-sight unit vectors are expressed as follows.

$$e_{Lij} = \frac{P_{Lij} - O_L}{|P_{Lij} - O_L|}$$

$$(i = 1, 2, \ldots, N, j = 1, 2)$$

$$e_{Rij} = \frac{P_{Rij} - O_R}{|P_{Rij} - O_R|}$$

$$(i = 1, 2, \ldots, N, j = 1, 2)$$

At this point, the line-of-sight unit vector $e_{Lij}$ and the line-of-sight unit vector $e_{Rij}$ in the base camera coordinate system are constants that can be determined uniquely using the corresponding points extracted from the images and the internal parameters and the external parameters of the cameras.

Here, unknown three-dimensional coordinates $X_{ij}=(x_{ij}, y_{ij}, z_{ij})$ are introduced to determine the distances between $X_{ij}$ and the lines of sight. The distance $d_{Lij}$ and distance $d_{Rij}$ to be determined are expressed using the outer products as follows.

$$d_{Lij} = |e_{Lij} \times (X_{ij} - O_L)| (i=1,2,\ldots,N, j=1,2)$$

$$d_{Rij} = |e_{Rij} \times (X_{ij} - O_R)| (i=1,2,\ldots,N, j=1,2)$$

At the end of step S106, the line-of-sight error term corresponding to the distances $d_{Lij}$, $d_{Rij}$ between the unknown three-dimensional coordinates $X_{ij}$ and the lines of sight is added to the evaluation function. In the embodiment, the sum of squared distances $d_{Lij}$ and $d_{Rij}$ is added to the evaluation function F. If the line-of-sight error term portion of the evaluation function F at the point of adding the i-th line-of-sight error term is written as $F_{sight(i)}$, $F_{sight(i)}$ is given as follows.

$$F_{sight(i)} = F_{sight(i-1)} + d_{Lij}^2 + d_{Rij}^2$$

After the line-of-sight error term is added, the procedure returns to step S102 to determine whether to add mapping, and processing steps S103 to S106 are repeated until the end of the mapping processing is determined. A line-of-sight error term is added each time the processing is repeated. As a result, a line-of-sight error term portion $F_{sight(N)}$ of the evaluation function after N iterations is as follows.

$$F_{sight(N)} = \sum_{i=1}^{N} \sum_{j=1}^{2} (d_{Lij}^2 + d_{Rij}^2)$$

Here, the line-of-sight error term portion $F_{sight(N)}$ of the evaluation function is a function having 6N variables ($x_{11}$, $y_{11}$, $z_{11}$, $x_{12}$, $y_{12}$, $z_{12}$, ..., $x_{N1}$, $y_{N1}$, $z_{N1}$, $x_{N2}$, $y_{N2}$, $z_{N2}$). To aid understanding, an example of the mapping data structure at the point of exiting the loop is illustrated in FIG. 8. When mapping is done between an edge line of the base image 22b and an edge line $R_{\beta(i)}$ of the reference image 23b at the time of the i-th mapping, a three-dimensional edge line Ei is defined for the combination. In this case, image points $P_{Li1}$ and $P_{Li2}$ on the edge line $L_{\alpha(i)}$ of the base image 22b and image points $P_{Ri1}$ and $P_{Ri2}$ on the edge line $R_{\beta(i)}$ of the reference image 23b are determined as corresponding points, respectively. Further, the three-dimensional edge line Ei has two endpoints $X_{i1}={}^T(x_{i1}, y_{i1}, z_{i1})$ and $X_{i2}={}^T(x_{i2}, y_{i2}, z_{i2})$. The line-of-sight error term ($d_{Lij}^2$, $d_{Rij}^2$) defined for the three-dimensional coordinates $X_{ij}$ (i=1, 2, ..., N, j=1, 2) of each endpoint.

Next, a constraint condition between two edge lines is set and a constraint condition term is determined (steps S107 to S111). First, in step S107, it is determined whether to add a constraint condition. This determination may be made by entering the necessity of addition based on the user's discretion, or using an automatic determination algorithm. The subsequent processing steps S108 to S111 are repeated until the addition of constraint conditions is ended.

Next, two three-dimensional edge lines used to set the constraint conditions are selected. Note that one three-dimensional edge line corresponds to one combination set in steps S103 and S104. For example, E1 is selected in step S108 and E2 is selected in step S109 from a list of three-dimensional edge lines illustrated in FIG. 8.

Further, a geometric three-dimensional constraint condition between edge lines is selected for the two edge lines selected in steps S108 and S109. In other words, an already known positional relationship between edge lines of the workpiece 10 is set. In the embodiment, among geometric relations between two edge lines, four kinds, namely "two edge lines lie on the same plane," "two edge lines lie on the same straight line," "the directions of two edge lines are parallel," and "the directions of two edge lines are perpendicular" are handled. Among the above four kinds of three-dimensional constraint conditions, one is selected and the procedure proceeds to step S111.

Next, a three-dimensional constraint condition term $f_{const(k)}$ is added to the evaluation function according to the three-dimensional constraint condition set in step S110 (see FIG. 4B). First, in step S201, a three-dimensional constraint condition term to be added is selected. The following will describe the content of a three-dimensional constraint condition term according to each three-dimensional constraint condition. In the following description of steps S202 to S205, it is assumed that both endpoints of the edge line selected in step S108 are denoted by $X_{a1}$, $X_{a2}$ and both endpoints of the edge line selected in step S109 are denoted by $X_{b1}$, $X_{b2}$.

When a three-dimensional constraint condition that "two edge lines lie on the same plane (add same plane term: step S202)" is selected, the following processing is performed. As the same plane term, a function for minimizing the value thereof when two edge lines lie on the same plane is used. For example, a condition that four points exist on the same plane can be expressed in the following equation because $X_{a2}$ also exists on a plane with three points $X_{a1}$, $X_{b1}$, and $X_{b2}$.

$$(X_{a2}-X_{a1}) \cdot \{(X_{b1}-X_{a1}) \times (X_{b2}-X_{a1})\}=0$$

Therefore, a same plane term $f_{plane}$ as mentioned below is substituted as the k-th constraint condition term $f_{const(k)}$.

$$f_{const(k)}=f_{plane}=\lambda_k \|(X_{a2}-X_{a1}) \cdot \{(X_{b1}-X_{a1}) \cdot (X_{b2}-X_{a1})\}\|$$

Here, $\lambda_k$ is a weighting factor that is a constant used to adjust weighting between different three-dimensional constraint conditions. The weighting factor $\lambda_k$ may be set by the user individually or using an algorithm for determining weighting according to the length of each edge line.

Next, when a three-dimensional constraint condition that "two edge lines lie on the same straight line" is selected, the following processing is performed. As the same straight line term, a function for minimizing the value thereof when two edge lines lie on the same straight line is used. For example, a condition that three points lie on the same straight line can be expressed in the following equation using the outer product.

$$(X_{a2}-X_{a1}) \times (X_{b1}-X_{a1})=0$$

Therefore, a same straight line term $f_{linear}$ is substituted as the k-th constraint condition term $f_{const(k)}$.

$$f_{const(k)}=f_{linear}=\lambda_{k1}\|(X_{a2}-X_{a1}) \cdot (X_{b1}-X_{a1})\|+\lambda_{k2}\|(X_{a2}-X_{a1}) \times (X_{b2}-X_{a1})\|$$

Here, $\lambda_{k1}$ and $\lambda_{k2}$ are weighting factors that are constants used to adjust weighting between different three-dimensional constraint conditions. Like the same plane term, the weighting factors $\lambda_{k1}$ and $\lambda_{k2}$ may be set by the user individually or using an algorithm for determining weighting according to the length of each edge line.

Next, when a three-dimensional constraint condition that "two edge lines are parallel" is selected, the following processing is performed. As the parallelism term, a function for minimizing the value thereof when two edge lines are parallel is used. The condition that "two edge lines are parallel" can be expressed in the following mathematical expression using the outer product of vectors.

$$\|(X_{a2}-X_{a1}) \times (X_{b2}-X_{b1})\|=0$$

Therefore, a parallelism term $f_{parallel}$ as mentioned below is substituted as the k-th constraint condition term $f_{const(k)}$.

$$f_{const(k)}=f_{parallel}=\lambda_k\|(X_{a2}-X_{a1}) \times (X_{b2}-X_{b1})\|$$

Here, $\lambda_k$ is a weighting factor that is a constant used to adjust weighting between different three-dimensional constraint conditions. Like the other constraint condition terms, the weighting factor $\lambda_k$ may be set by any method.

Next, when a three-dimensional constraint condition that "two edge lines are perpendicular" is selected, the following processing is performed. As the perpendicularity term, a function for minimizing the value thereof when two edge lines are perpendicular is used. The condition that two edge lines are perpendicular can be expressed in the following mathematical expression using the inner product of vectors.

$$(X_{a2}-X_{a1}) \cdot (X_{a2}-X_{a1})=0$$

Therefore, a perpendicularity term $f_{vertical}$ is substituted as the k-th constraint condition term $f_{const(k)}$.

$$f_{const(k)}=f_{vertical}=\lambda_k\|(X_{a2}-X_{a1}) \cdot (X_{a2}-X_{a1})\|$$

Here, $\lambda_k$ is a weighting factor that is a constant used to adjust weighting between different three-dimensional constraint conditions. Like the other constraint condition terms, the weighting factor $\lambda_k$ may be set by any method. In the embodiment, the constraint condition term $f_{const(k)}$ is a function having twelve variables ($x_{a1}$, $y_{a1}$, $z_{a1}$, $x_{a2}$, $y_{a2}$, $z_{a2}$, $x_{b1}$, $y_{b1}$, $z_{b1}$, $x_{b2}$, $y_{b2}$, $z_{b2}$).

After the constraint condition term $f_{const(k)}$ is added in step S111, the procedure returns to step S107 to determine whether further to add a three-dimensional constraint condition. The processing steps S108 to S111 are repeated until the addition of constraint conditions is ended. Any number of three-dimensional constraint condition terms $f_{const(k)}$ can be set within a consistent range. For example, two three-dimensional constraint conditions "on the same plane" and "perpendicular" can be set for certain two edge lines. When M three-dimensional constraint conditions are set through the loop of steps S107 to S111, the constraint condition term portion $F_{const(M)}$ of the evaluation function F is as follows.

$$F_{const(M)} = \sum_{k=1}^{M} f_{const(k)}$$

$F_{const(M)}$ is a function having 6N variables ($x_{11}$, $y_{11}$, $z_{11}$, $x_{12}$, $y_{12}$, $z_{12}$, . . . , $x_{N1}$, $y_{N1}$, $z_{N1}$, $x_{N2}$, $y_{N2}$, $z_{N2}$) at a maximum. Note that the actual number of variables included in $F_{const(M)}$ corresponds to the number of edge lines selected in steps S108 and S109.

Next, the evaluation function F is set (evaluation function setting process) from the line-of-sight error term portion $F_{sight(N)}$ added in steps S102 to S106 and the constraint condition term portion $F_{const(M)}$ added in the processing steps S107 to S111. As mentioned above, the evaluation function F is expressed as the sum of the line-of-sight error term portion $F_{sight(N)}$ and the constraint condition term portion $F_{const(M)}$, i.e., expressed as follows.

$$F\begin{pmatrix} x_{11}, y_{11}, z_{11}, x_{12}, y_{12}, z_{12}, \ldots, \\ x_{N1}, y_{N1}, z_{N1}, x_{N2}, y_{N2}, z_{N2} \end{pmatrix} = F_{sight(N)} + F_{const}(M)$$

$$= \sum_{i=1}^{N} \sum_{j=1}^{2} (d_{Lij}^2 + d_{Rij}^2) + \sum_{k=1}^{M} f_{const(k)}$$

Next, the three-dimensional coordinates $X_{ij}$ (i=1, 2, ..., j=1, 2) is determined by minimizing the evaluation function F (three-dimensional coordinate measurement process), i.e., the following set of variables ($x_{11}$, $y_{11}$, $z_{11}$, $x_{12}$, $y_{12}$, $z_{12}$, ..., $x_{N1}$, $y_{N1}$, $z_{N1}$, $x_{N2}$, $y_{N2}$, $z_{N2}$) is determined for the evaluation function F.

$$F(x_{11}, y_{11}, z_{11}, x_{12}, y_{12}, z_{12}, \ldots, x_{N1}, y_{N1}, z_{N1}, x_{N2}, y_{N2}, z_{N2}) \Rightarrow \min$$

This calculation may be made by using a known multivariable optimization method. For example, the Nelder-Mead downhill simplex method as one of nonlinear search techniques can be used.

The coordinate values ($x_{11}$, $y_{11}$, $z_{11}$, $x_{12}$, $y_{12}$, $z_{12}$, ..., $x_{N1}$, $y_{N1}$, $z_{N1}$, $x_{N2}$, $y_{N2}$, $z_{N2}$) determined by the above processing form a shape recreated in consideration of the three-dimensional constraint conditions between edge lines. In addition, according to the embodiment, any three-dimensional constraint condition can be applied between a plurality of edge lines stereoscopically arranged. Therefore, a highly accurate shape can be obtained in comparison with the conventional techniques.

Second Embodiment

Figure 11A:
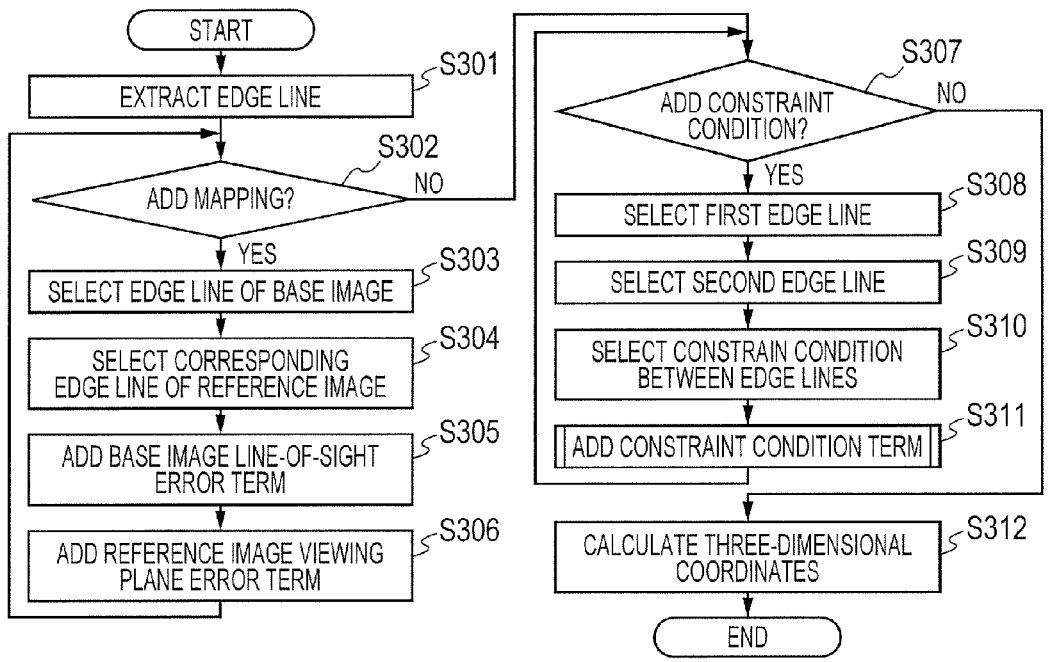
FIG. 11A and FIG. 11B are flowcharts illustrating a measurement of three-dimensional coordinates according to the second embodiment.
Figure 11B:
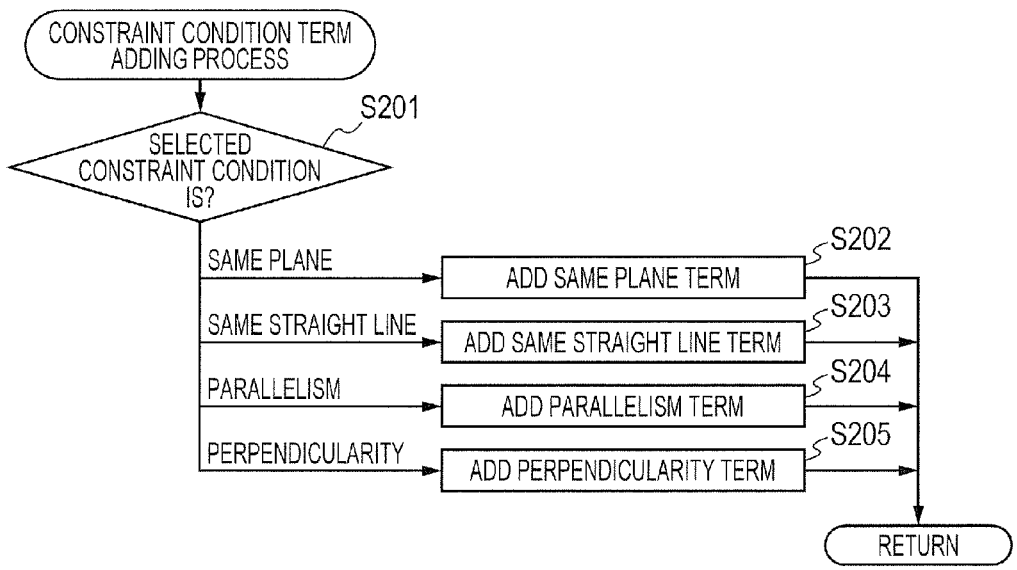
Figure 12:
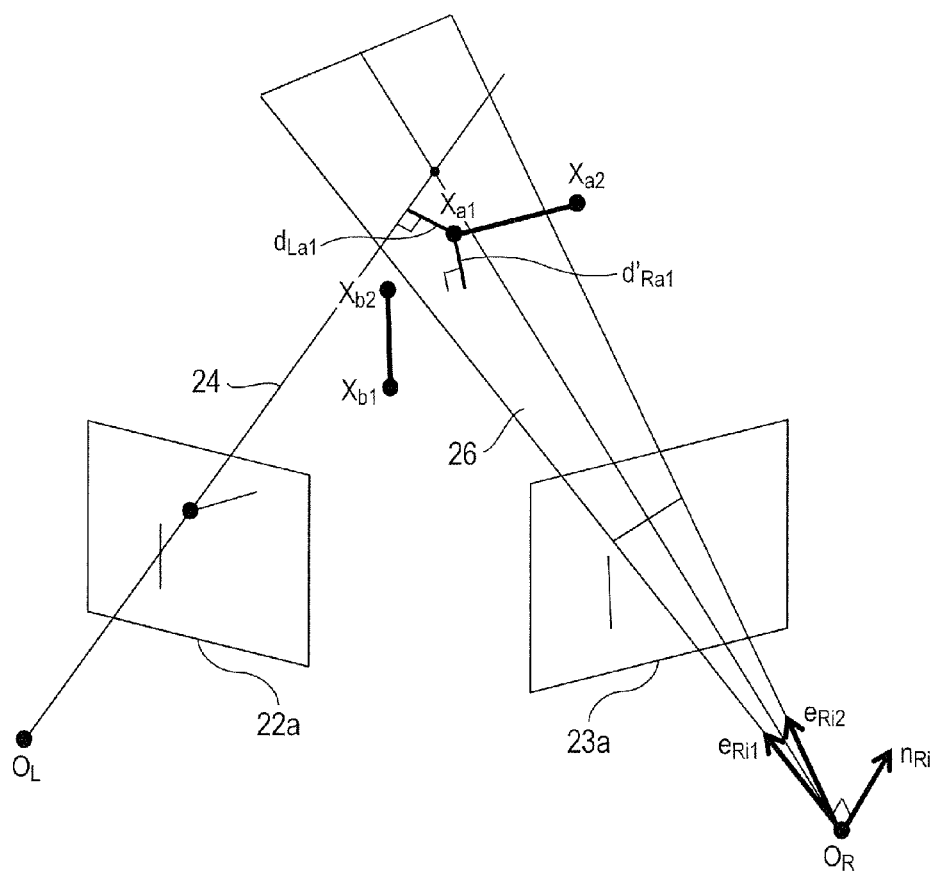
FIG. 12 is a schematic diagram for describing a line-of-sight error and a viewing plane error according to the second embodiment.

Next, a robot system 1A according to a second embodiment of the present invention will be described with reference to FIG. 10 to FIG. 12 while using FIG. 1 and FIG. 2. In the second embodiment, a method of measuring the three-dimensional coordinates of a workpiece by the camera control unit 5A is different from that in the first embodiment. Therefore, in the second embodiment, an emphasis is placed on a point different from the first embodiment, i.e. on the method of measuring the three-dimensional position by the camera control unit, and the same components as those in the first embodiment are given the same reference numerals to omit the description.

First, a schematic structure of the robot system 1A will be described with reference to FIG. 10 while using FIG. 1 and FIG. 2. FIG. 10 is a block diagram illustrating the configuration of a camera control unit 5A according to the second embodiment.

As illustrated in FIG. 1 and FIG. 2, the robot system 1A according to the second embodiment includes the robot 2, the mounting base 3, and a control device 4A for controlling the robot 2. The control device 4A includes a calculating device 40A and the storing device 41. The calculating device 40A includes a CPU 40aA, the image processing device 40b, and the sound processing device 40c. The CPU 40aA includes the camera control unit 5A and the robot control unit 6.

Figure 10:
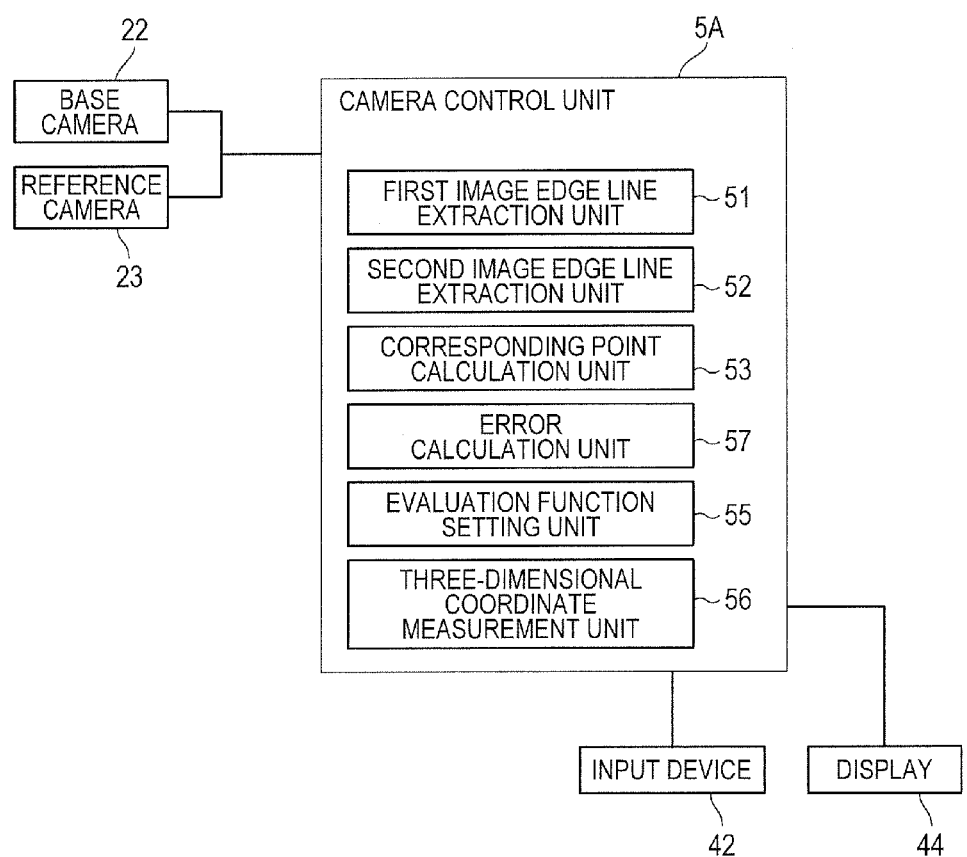
FIG. 10 is a block diagram illustrating the configuration of a camera control unit according to a second embodiment.

As illustrated in FIG. 10, the camera control unit 5A includes the first image edge line extraction unit 51, the second image edge line extraction unit 52, the corresponding point calculation unit 53, an error calculation unit 57, the evaluation function setting unit 55, and the three-dimensional coordinate measurement unit 56. The error calculation unit 57 sets provisional three-dimensional coordinates to calculate a line-of-sight error at an endpoint of a first edge line with respect to the provisional three-dimensional coordinates. The error calculation unit 57 also calculates a viewing plane error at an endpoint of a second edge line with respect to the provisional three-dimensional coordinates.

Next, a method of measuring the three-dimensional position of a workpiece by the camera control unit 5A when the hand 21 in the robot system 1A structured as mentioned above grips the workpiece will be described along flowcharts illustrated in FIGS. 11A and 11B while referring to FIG. 12. FIGS. 11A and 11B are flowcharts illustrating a measurement of three-dimensional coordinates according to the second embodiment. FIG. 12 is a schematic diagram for describing a line-of-sight error and a viewing plane error according to the second embodiment.

As a basic flow, edge lines are first extracted from a base image 22b and a reference image 23b imaged with the base camera 22 and the reference camera 23 from a plurality of different view points (step S301). Next, it is determined whether to repeat the addition of mapping (step S302). Then, a first edge line is selected from the plurality of edge lines of the base image 22b, and a corresponding second edge line is selected from the reference image 23b (mapping) (S303 and S304). Then, a line-of-sight error term on the first edge line of the base image 22b is calculated (S305). Similarly, a viewing plane error term on the reference image 23b is calculated (S306). Further, a geometric three-dimensional constraint condition is set between mapped two edge lines to calculate a three-dimensional constraint condition term (S307 to S311). Finally, an optimization problem is solved so as to minimize the value of an evaluation function including the line-of-sight error term, the viewing plane error term, and the three-dimensional constraint condition term to determine the three-dimensional coordinates (S312).

In the second embodiment, the processing steps S301 to S304 until the selection of the second edge line mapped after the selection of the first edge line are the same as those in the first embodiment. The processing steps S307 to S311 to add a three-dimensional constraint condition are also the same as those in the first embodiment. Therefore, the detailed description thereof will be omitted. The following will describe points different from the first embodiment, i.e. processing for adding a line-of-sight error term on an endpoint of the first edge line and adding a viewing plane error term on the second edge line (steps S305 and S306), and a calculation of the three-dimensional coordinates (S312).

First, a line-of-sight error term on an endpoint of the first edge line selected in step S303 is determined and added to the evaluation function. Although the way to think about the line-of-sight error term is the same as that in the first embodiment, only the line-of-sight error term on the base image line of sight 24 is added. The line-of-sight error term $d_{Lij}^2$ on the base image line of sight 24 is expressed as follows.

$$d_{Lij}^2 = \left| \frac{P_{Lij} - O_L}{|P_{Lij} - O_L|} \times (X_{ij} - O_L) \right|^2$$

$(i = 1, 2, \ldots, N, j = 1, 2)$

Next, a viewing plane error term is determined from both endpoints of the second edge line selected in step S304, and added to the evaluation function. The viewing plane error term is distance between unknown three-dimensional coordinates X and a viewing plane created by a point group on the selected second edge line. A normal vector $n_{Ri}$ for defining the viewing plane is determined as follows.

$$n_{Ri} = e_{Ri2} \times e_{Ri1}$$

Distance d between the reference image viewing plane and the unknown point X is the magnitude of a normal direction component of a vector directed from the origin O to X. Therefore, the viewing plane error term $d'_{Rij}$ can be expressed as follows.

$$d_{Rij}' = |n_{Ri} \cdot (X_{ij} - O_R)| (i=1,2,\ldots,N, j=1,2)$$

Assuming that the evaluation is performed using the squared sum, the following term is added to the evaluation function.

$$d_{Rij}'^2 = \{n_{Ri} \cdot (X_{ij} - O_R)\}^2 (i=1,2,\ldots,N, j=1,2)$$

After the error term is added, the procedure returns to step S302 to determine whether to end the addition of mapping, and the processing steps S302 to S306 are repeated until the end of addition is determined. Each time the processing is repeated, the line-of-sight error term $d_{Lij}^2$ and the viewing plane error term $d'_{Rij}^2$ are added. As a result, an error term portion $F_{sight(N)}$ of the evaluation function F after N iterations is as follows.

$$F_{sight(N)} = \sum_{i=1}^{N} \sum_{j=1}^{2} (d_{Lij}'^2 + d_{Rij}'^2)$$

After the end of addition is determined in step S302, the processing for adding a constraint condition is performed in steps S307 to S311. As mentioned above, since the processing for adding a three-dimensional constraint condition is the same as the processing steps S107 to S111 in the first embodiment, the description thereof will be omitted. Even when the viewing plane error term is used instead of the line-of-sight error term like in this embodiment, the same calculation formula can be applied as the three-dimensional constraint condition term.

Next, an evaluation function F is set by integrating the line-of-sight error term and the viewing plane error term added in steps S302 to S306, and the three-dimensional constraint condition term added in the processing steps S307 to S311 (evaluation function setting process). As mentioned above, the evaluation function F is expressed as the sum of the error term portion $F_{sight(N)}$ and the constraint condition term portion $F_{const(M)}$, i.e., expressed as follows.

$$F\begin{pmatrix} x_{11}, y_{11}, z_{11}, x_{12}, y_{12}, z_{12}, \ldots, \\ x_{N1}, y_{N1}, z_{N1}, x_{N2}, y_{N2}, z_{N2} \end{pmatrix} = F_{sight(N)} + F_{const}(M)$$

$$= \sum_{i=1}^{N} \sum_{j=1}^{2} (d_{Lij}'^2 + d_{Rij}^2) + \sum_{k=1}^{M} f_{const(k)}$$

Next, the evaluation function F is minimized to determine the three-dimensional coordinates $X_{ij}$ (i=1, 2, ..., N, j=1, 2) (three-dimensional coordinate measurement process). That is, the following set of variables ($x_{11}, y_{11}, z_{11}, x_{12}, y_{12}, z_{12}, \ldots, x_{N1}, y_{N1}, z_{N1}, x_{N2}, y_{N2}, z_{N2}$) is determined for the evaluation function F.

$$F(x_{11}, y_{11}, z_{11}, x_{12}, y_{12}, z_{12}, \ldots, x_{N1}, y_{N1}, z_{N1}, x_{N2}, y_{N2}, z_{N2}) \Rightarrow \min$$

Like in the first embodiment, this calculation for determining the set of variables can be made by using a known multivariable optimization method.

As described above, according to the method of measuring a three-dimensional position of this embodiment, a three-dimensional shape measurement in which a plurality of known stereoscopic constraint conditions are reflected together for the positional relationship between lines obtained by approximating edge lines of a workpiece can be performed. Therefore, data on a highly accurate three-dimensional shape can be obtained in comparison with the conventional techniques.

Further, according to the method of measuring a three-dimensional position of the embodiment, the need to perform processing for "uniquely determining corresponding points using the epipolar constraints" is eliminated to calculate the three-dimensional coordinates. This eliminates the need to determine corresponding points on the reference image 23b ahead with respect to the first edge line extracted from the base image 22b. When the epipolar constraints are not satisfied due to an error in camera parameter or an error in extracting an edge line, the corresponding points become inaccurate in the case of using the method in which the corresponding points are determined. In this case, use of the method in the embodiment can reduce this influence.

While the embodiments of the present invention have been described, the present invention is not limited to the aforementioned embodiments. Further, the advantageous effects of the embodiments of the present invention are merely listed as most preferred effects derived from the present invention, and the effects of the present invention are not limited to those described in the embodiments of the present invention.

For example, in the embodiments, the description has been made by using two cameras, i.e. the base camera and the reference camera for the sake of simplicity, but the present invention is not limited thereto. For example, even when the number of cameras is three or more, the method of the present invention can be applied by adding a viewing plane error term with respect to each reference camera. Further, if the view point of the workpiece varies, images obtained by capturing the workpiece plural times while moving the same camera can also be used.

Further, for example, the three-dimensional coordinates are determined by minimizing the value of the evaluation function in the embodiments, but the present invention is not limited thereto. For example, the three-dimensional coordinates may be determined by maximizing the value of the evaluation function.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, since the optimization calculation of an evaluation function in which multiple three-dimensional constraint conditions to be met together are set is performed, a highly accurate three-dimensional shape can be measured.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-149596, filed Jul. 3, 2012, which is hereby incorporated by reference herein in its entirety.

What is claimed is:

1. A three-dimensional measurement apparatus comprising:
   a first camera arranged to capture an object to acquire a first image;
   a second camera arranged to capture the object from a view point different from that of the first camera to acquire a second image; and
   a control unit configured to
      extract a plurality of edge lines of the object respectively from the first image and the second image,
      calculate each of line-of-sight errors with respect to provisional three-dimensional coordinates, wherein the line-of-sight errors are calculated from an endpoint of a first edge line selected from the plurality of edge lines of the first image and an endpoint of a second edge line extracted from the plurality of edge lines of the second image so as to correspond to the first edge line,
      set an evaluation function from the respective line-of-sight errors and a three-dimensional constraint condition set based on a relationship between different elements of a three-dimensional shape of the object, and
      make an optimization calculation based on the evaluation function to determine three-dimensional coordinates of the object.

2. The three-dimensional measurement apparatus according to claim 1, wherein the three-dimensional constraint condition is obtained by setting one or more of the conditions that two edge lines of the plurality of edge lines of the first image or the second image lie on a same plane, they lie on a same straight line, they are substantially perpendicular to each other, and they are substantially parallel to each other.

3. A robot system comprising:
   the three-dimensional measurement apparatus for three-dimensional measurement of an object, according to claim 1; and
   a robot arm arranged to grip the object based on a three-dimensional position of the object measured by the three-dimensional measurement apparatus.

4. A three-dimensional measurement apparatus comprising:
   a first camera arranged to capture an object to acquire a first image;
   a second camera arranged to capture the object from a view point different from that of the first camera to acquire a second image; and
   a control unit configured to
      extract a plurality of edge lines of the object respectively from the first image and the second image,
      calculate a line-of-sight error at an endpoint of a first edge line with respect to provisional three-dimensional coordinates, wherein the first edge line is selected from the plurality of edge lines of the first image,
      calculate a viewing plane error in a second edge line with respect to the provisional three-dimensional coordinates, wherein the second edge line is extracted from the plurality of edge lines of the second image so as to correspond to the first edge line,
      set an evaluation function from the line-of-sight error at the endpoint of the first edge line, the viewing plane error in the second edge line, and a three-dimensional constraint condition set based on a relationship between different elements of a three-dimensional shape of the object, and
      make an optimization calculation based on the evaluation function to determine three-dimensional coordinates of the object.

5. A robot system comprising:
   the three-dimensional measurement apparatus for three-dimensional measurement of an object, according to claim 4; and
   a robot arm arranged to grip the object based on a three-dimensional position of the object measured by the three-dimensional measurement apparatus.

6. A three-dimensional measurement method comprising:
   extracting a plurality of edge lines of an object from a first image acquired by capturing the object with a first camera;
   extracting a plurality of edge lines of the object from a second image acquired by capturing the object with a second camera;
   calculating an endpoint of a second edge line corresponding to an endpoint of a first edge line, wherein the second edge line is extracted from the plurality of edge lines of the second image so as to correspond to the first edge line selected from the plurality of edge lines of the first image;
   calculating each of line-of-sight errors at the endpoint of the first edge line and the endpoint of the second edge line with respect to provisional three-dimensional coordinates;
   setting an evaluation function from the line-of-sight errors respectively set at the endpoint of the first edge line and the endpoint of the second edge line, and a three-dimensional constraint condition set based on a relationship between different elements of a three-dimensional shape of the object; and
   making an optimization calculation to minimize or maximize a value of the evaluation function to determine three-dimensional coordinates of the object.

7. A non-transitory computer-readable recording medium on which the three-dimensional measurement program for causing a computer to execute the method according to claim 6 is recorded.

8. A three-dimensional measurement method comprising:
   extracting a plurality of edge lines of an object from a first image acquired by capturing the object with a first camera;
   extracting a plurality of edge lines of the object from a second image acquired by capturing the object with a second camera;

calculating a line-of-sight error at an endpoint of a first edge line with respect to provisional three-dimensional coordinates, wherein the first edge line is arbitrarily selected from the plurality of edge lines of the first image, and a viewing plane error in a second edge line with respect to the provisional three-dimensional coordinates, wherein the second edge line is extracted from the plurality of edge lines of the second image so as to correspond to the first edge line;

setting an evaluation function from the line-of-sight error at the endpoint of the first edge line, the viewing plane error in the second edge line, and a three-dimensional constraint condition set based on a relationship between different elements of a three-dimensional shape of the object; and making an optimization calculation to minimize or maximize a value of the evaluation function to determine three-dimensional coordinates of the object.

9. A non-transitory computer-readable recording medium on which the three-dimensional measurement program for causing a computer to execute the method according to claim 8 is recorded.

\* \* \* \* \*